Figure 1:
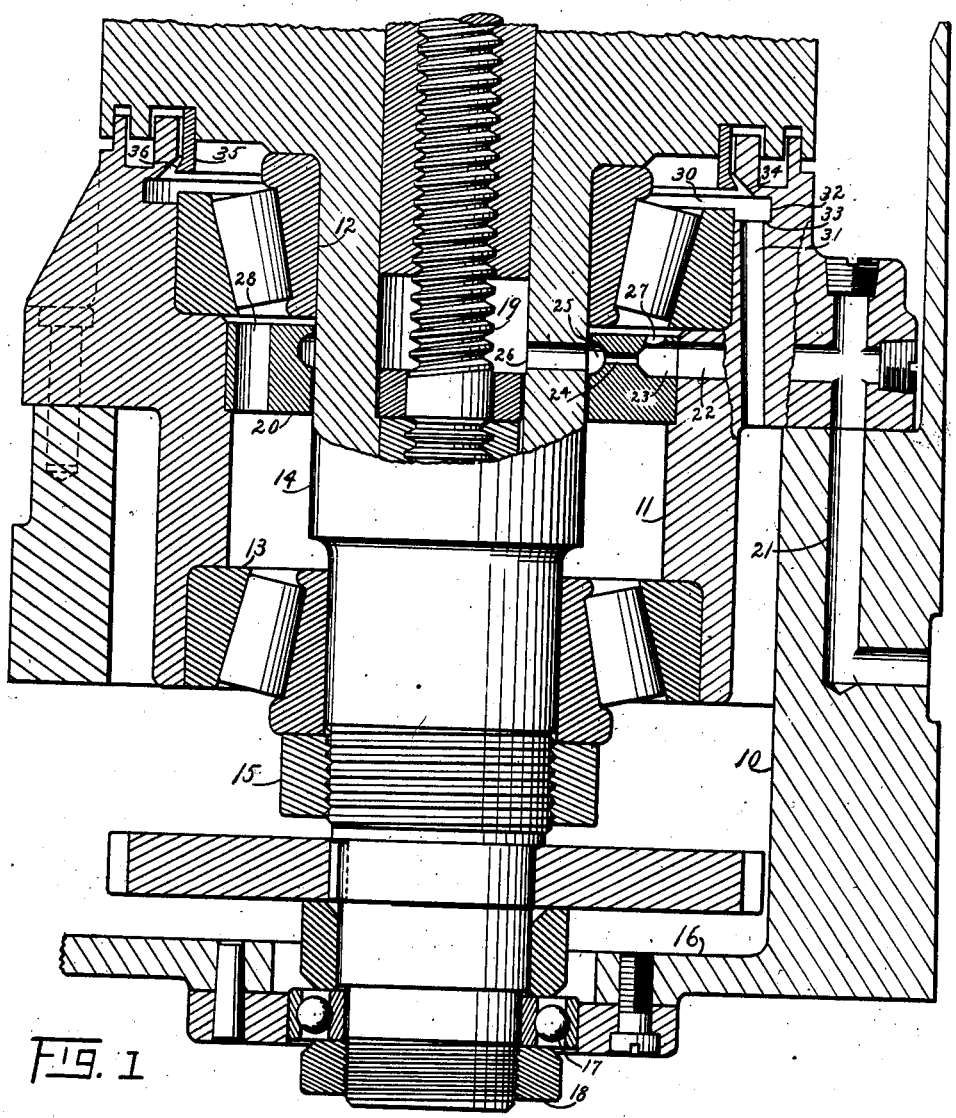

Patented Mar. 1, 1938

2,109,766

UNITED STATES PATENT OFFICE 2,109,766

MACHINE TOOL SPINDLE LUBRICATION

Edward P. Bullard, III, Fairfield, Conn., assignor to The Bullard Company, a corporation of Connecticut Application March 10, 1937, Serial No. 130,111

4 Claims. (Cl. 82—30)

This invention relates to spindle lubrication and is especially adapted for machine tools and is shown, by way of illustration, as applied to machine tools of the type having work holding chucks mounted upon spindles using anti-friction bearings.

An object of the invention is to provide a means to efficiently lubricate a spindle bearing at all speeds.

Another object is to utilize the centrifugal force exerted by a revolving element of special form to distribute a lubricating fluid to the desired points where it is to be utilized.

Another object is to provide a construction which utilizes centrifugal forces in the directing of the flow of lubricating fluid so as to automatically control the course of the fluid.

A further, and more specific, object of the invention is to provide a spindle bearing construction in which the pumping action, characteristic of tapered roller bearings, is used to promote the lubrication of the bearings.

In that form of the invention herein disclosed, by way of illustration, the invention is applied to the spindles of a multiple spindle machine. It is, however, obvious that the invention is equally applicable to single spindle machines. The usual arrangement is to have two roller bearings of the conventional tapered roller design to support the upper end of the spindle while the lower end rotates in a single ball bearing assembly.

It was found in practice that, in the usual method of lubrication, centrifugal force, instigated by the rapidly revolving rollers, tends to force the lubricant to the upper and larger edge of the bearing cup, depriving the lower part of the rollers and the bearing from proper lubrication. Another difficulty encountered was that the lubricant forced up by the rollers, finding no other outlet above the bearing, flowed over the outside of the spindle carrier. This invention eliminates both of these objectionable features, providing sure and sufficient lubrication at all speeds of the spindle and precluding the escape of lubricant outside the spindle carrier.

Other objects and advantages will be apparent from a consideration of the following description taken in conjunction with the accompanying drawing of a vertical, sectional view of one spindle of a multiple spindle machine embodying this invention.

An aperture in a carrier 10, shown in the drawing, receives a housing 11 provided with recesses for upper and lower roller bearing assemblies 12 and 13, forming anti-friction bearings for a spindle 14; the bearings being adjustable by a threaded nut 15 as is customary in such assemblies. A lower projecting arm 16 on the carrier receives the lower end of the spindle 14 enclosed in a ball bearing 17 secured by a nut 18.

The upper end of the spindle 14 may be provided with chucks (not shown) which may be operable to secure, or release, work pieces through the rotation of a chuck operating screw 19. Since the invention is not limited to the chucks, or their operation, a detail showing and description thereof is omitted.

Encircling the spindle 14, below the upper roller bearing 12, an oil feed ring 20 is fitted into and secured against rotation with the housing 11. Lubricating oil from a suitable source of pressure may be supplied through a duct 21 in the carrier 10, which is in registration with a duct 22 in the housing 11. The duct 22 registers with a distributing duct 23 in the ring 20 and communicates through a small opening 24 with an internal annular groove 25 of the ring 20 whereby oil may be delivered therethrough and through an opening 26 in the spindle so as to provide lubrication for the chuck operating mechanism. The duct 23 further communicates with a small opening 27 with the upper bearing assembly 12 and oil may also be discharged downwardly from the assembly 12 through openings 28 in the ring 20 so as to provide lubrication through the lower bearing assembly 13.

Above the upper bearing assembly 12, there is formed in the housing 11 a circumferential recess 30 of larger diameter than the bearing and having a drain outlet 31. The outer wall of the recess 30 is made up of two surfaces, a lower surface 32 of the wall perpendicular to floor 33 and a bevelled upper surface 34 of less diameter than the lower surface contracting gradually upward forming a recess of rectangular section with a bevelled surface leading into it. Securely attached to the spindle is a ring 35 having parallel sides on its upper section, while on the outside of the lower portion is a peripheral flange 36 coinciding with the inclined surface 34 of the recess 30.

In the operation of the device, oil is supplied through the ducts 21 and 22 to the ring 20 and through the aperture 24, groove 25 and opening 28 to the lower spindle bearing where it may be used for lubricating the chuck operating mechanism. Oil is also supplied from the duct 23 through the passage 27 to the underside of the upper bearing 12. The rotation of the mechanical bearing elements effects the pumping action of the oil which lifts it through the bearings to the recess 30 thereabove. Oil also flows through the aperture 24 of the ring 20 to lubricate the lower bearing 13. It will be apparent that lubricant thrown upon the revolving ring 35 will be carried by centrifugal force to the largest diameter of the flange 36 and thrown therefrom on to the inclined surface 34 to drain into the recess 30 and, in turn, to return to the sump by means of the drain 31.

From the foregoing description, it will be seen by applying a jet of oil to the lower end of the rollers in the upper bearings to be worked up to the top of the cup by the centrifugal force generated by the rapidly rotating rollers provides a positive and ample supply of oil to the bearing assembly irrespective of the speed of the spindle. The concentric inclined surfaces, one on the revolving ring on the chuck holders and the other on the stationary recess of the bearing housing, combine with the utilization of centrifugal force to form an efficient means to prevent lubricant from overflowing upon the spindle carriage.

It will be understood, of course, that the invention is not limited to the structural details herein illustrated, but that numerous changes, modifications and the full use of equivalents may be resorted to without departure from the spirit or scope of the appended claims.

Having set forth the nature of my invention, what I claim is:

1. In a spindle mounting including a spindle body and a head rotatable therewith of a mounting structure over which said head extends and an annular ring carried by said head and extending downwardly within said mounting and having an outwardly extending lip within said mounting whereby rotary movement thereof will discharge lubrication by centrifugal force from said lip and within said mounting so as to preclude its passage between said head and said mounting.

2. In a machine tool spindle mounting, the combination of a hollow spindle, a mounting structure therefor, and a pair of conically tapered roller bearing assemblies and a duct mounted stationary with respect to said mounting and having discharge ports registerable with said spindle to deliver lubrication to the center of said spindle and with one of said bearings whereby lubrication will be carried through the bearing by centrifugal force of the rotation of said bearing.

3. In a machine tool spindle mounting, the combination of a hollow spindle, a mounting structure therefor, and a pair of conically tapered roller bearing assemblies and a duct mounted stationary with respect to said mounting and having discharge ports registerable with said spindle to deliver lubrication to the center of said spindle and with one of said bearings whereby lubrication will be carried through the bearing by centrifugal force of the rotation of said bearing and means carried by said spindle to cause centrifugal force to preclude the discharge of lubrication from between said spindle and said ports.

4. In a machine tool having a rotatable work carrying spindle, a work carrying head attached thereto, a bearing assembly comprising an inner bearing member rotatable with said spindle, an outer bearing member stationary with respect to said spindle, tapered rollers therebetween, said stationary member supported in a housing, said housing extending upwardly and terminating in a pair of concentric ribs cooperating with similar concentric grooves in said work carrying head, an annular recess located in said housing, between said outer stationary member and work carrying head, of substantially conical form contracting gradually toward the work carrying head of the spindle, an annular ring attached to said work carrying head rotatable therewith and extending into said recess so as to follow the contour of the substantially conical form of said recess at a distance therefrom, a source of fluid supply and a lubricating means including a jet of lubricating fluid directed through said bearing assembly on to said revolving ring where the action of centrifugal force is impressed upon the fluid by said revolving ring, being thrown therefrom on to the conical formed wall of the recess and returned to the source.

EDWARD P. BULLARD, III.